Patented Aug. 10, 1937

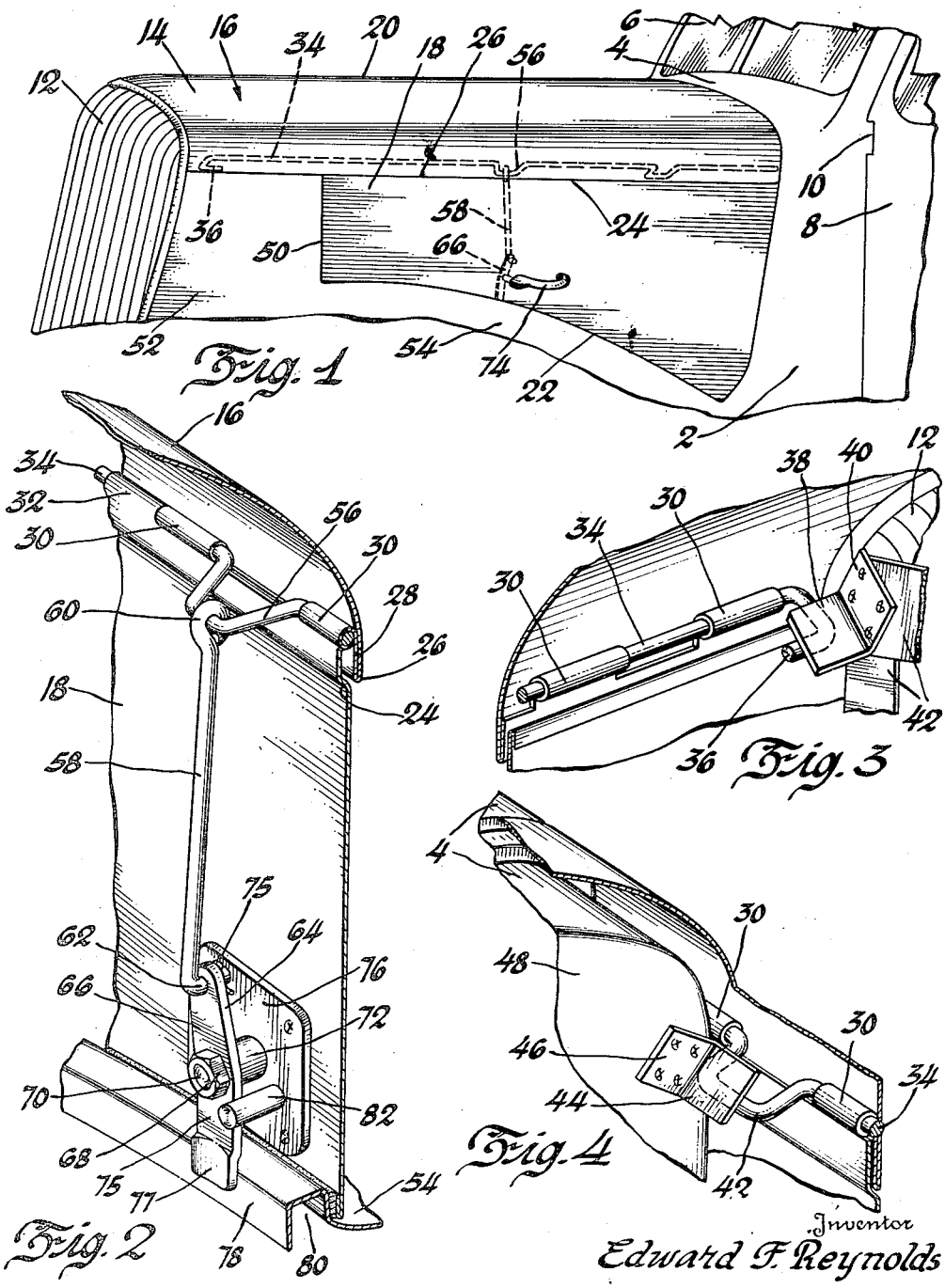

2,089,504

UNITED STATES PATENT OFFICE 2,089,504

HOOD FASTENER

Edward F. Reynolds, Flint, Mich., assignor to General Motors Corporation, Detroit, Mich., a corporation of Delaware Application July 6, 1936, Serial No. 88,980

11 Claims. (Cl. 292—45)

This invention relates to hood fasteners adapted for use on the hoods of automotive vehicles.

The conventional automobile hood comprises two lateral sections, each section comprising a top wing permanently hinged along the center line of the hood and a side wing hinged to the first section along a line between the top of the radiator and the top of the cowl. The hood latches in the prior art have been positioned at the bottom of the side wing of the hood and the handles have likewise been placed at the bottom of this side wing.

The present invention differs from the prior art in that the rod which is used to pivot together the top and side wings of the hood is suitably shaped or formed at its ends to engage keepers on the hood support and on the cowl, and intermediate its ends it is shaped to receive a link which extends downwardly along the inside of the side wing and at its lower end is secured to one arm of a crank which in turn is secured to the end of a handle journaled near the bottom of the side wing. The other arm of the crank in the locked position of the hood is adapted to engage behind a stationary part of the vehicle (such as the inner end of the fender) and hold the side wing in position and prevent rattle. The shaped sections of the combined hinge rod and hood latch are in the form of crank arms.

On the drawing—

Figure 1 is a view of the front part of an automotive vehicle showing the hood with the novel hood latch in dotted outline.

Figure 2 is a detailed perspective view showing the hinge between the wings of the hood section and the middle portion of the hood latch.

Figure 3 is an inside enlarged detailed view of the hood end of the latch.

Figure 4 is an enlarged detail view looking from the inside of the hood at the cowl end of the latch.

On the drawing, the numeral 2 indicates an automotive vehicle as a whole. The vehicle has the usual cowl 4, windshield 6, front door 8 hinged at 10, and a grille 12 in front of the radiator (not shown). These parts are in general conventional and per se form no part of the invention.

The hood 14 is composed of two lateral sections, each section having the top wing 16 and the side wing 18. The top wing 16 is permanently and stationarily hinged at the middle of the hood along the line indicated at 20. The side wing 18 has no stationary permanent hinge and the bottom 22 is left free. The upper edge 24 is hinged to the outer edge 26 of the top wing 16.

Referring to Figure 2, it will be noted that the edge 26 is return bent at 28 and is formed into eyes or bearings 30. The top edge 24 of the lower section 18 is formed into eyes or bearings 32 which alternate and register with the eyes or bearings 30 of the edges 26 of the top section 16. Through the alternating eyes 30 and 32 there is passed the hinge rod 34 which in this case, also forms a part of the hood latch.

The forward end of the rod 34 is bent into a hook or U shape as shown at 36 and engages behind a keeper 38 in the form of an angle plate, one arm 40 of which is secured to the support 42 of the radiator. The cowl end of the rod 34 is bent or formed into a crank arm 42 which engages behind a keeper 44 likewise in the form of an angle bracket, one arm 46 of which is secured to the cowl pan 48.

In Figure 1 the side wing 18 is shown as ending at 50 so that the forward edge 50 ends well to the rear of the radiator and radiator grille 12. This part is filled by a stationary panel 52 which merges into the fender 54, the inner outline of which is indicated below the lower edge 22 of the wing 18.

Intermediate the hooked ends 36 and 42 the rod 34 is shaped or formed with a U-shaped crank 56. A link 58 has a terminal eye 60 secured to the crank 56 and an L-shaped end 62 secured in an opening in one arm 64 of a crank 66, secured by means of a nut 68 to the end 70 of the shaft 72 of a handle 74. A cotter pin 75 holds the end 62 in the opening in the arm 64. The handle 74 is journaled adjacent the lower edge 22 of the wing 18 and a reinforcing plate 76 at the inside of the wing 18 serves as a mounting for the shaft 72. The second arm 75 on the crank 66 has its end 77 suitably shaped to engage behind the inner edge 78 of the fender 54. In order to strengthen the edge portion 78, it is preferably formed into a U-shape as shown at 80.

A pin 82 secured to the plate 76 serves as a stop to limit the throw of the arm 75 and to assure that the crank 66 stops in the position of the parts shown in Figure 2. This is the best position for holding the hood in locked position.

The operation of the device is as follows:—With the parts in the position shown in the figures of the drawing, the operator raises the handle 74 to cause the crank arm 66 to swing with the shaft 72 of the handle. This will cause the arm 64 to pull the crank 56 downwardly to rotate the rod 34 and cause the hooked ends 36 and 42 to swing away from their keepers 38 and 44. At the same time the rotation of the shaft 72 will cause the end 77 of the arm 74 to move away from the pin 82 and from behind the channel 80 of the fender edge 78. The latch is now in disengaged position and the operator may raise the lateral sections 14 of the hood by lifting the handles 74. The hood will break on its hinges 20 and on the rod 34 to enable it to be swung to allow inspection of the engine.

To place the hood in latched position, it is lowered from the position just described and the handle 74 now being in a vertical position is swung downwardly to cause the crank 66 to swing from the horizontal position to the vertical and throw the crank arm 56 from its lower or vertical position into the substantially horizontal position shown in Figure 2. This will cause the ends 36 and 42 to engage under their keepers and also to swing the end 77 behind the edge 78 to hold the hood in latched position. When the hood is in latched position the crank arm 56 and the link 66 are preferably slightly over center as is best shown in Figures 1 and 2 in order to prevent any opening movement of the hood. With the parts in the latched position, all of the engaging parts such as between the hook ends and the keepers and between the link 58 and its related parts, are slightly sprung to insure a tight connection.

I claim:

1. In a latch for the hood of an automotive vehicle, said hood comprising a plurality of lateral sections, each section comprising a plurality of wings, bearings on both sections, said bearings being in alignment, means mounted in the bearings to hinge one wing to the other, crank arms at the ends of said means adapted to engage with keepers mounted on the vehicle, a crank arm intermediate the said crank ends, and a handle operatively connected with the said last named crank to operate the said means to cause the end cranks to be engaged with or disengaged from the keepers.

2. In a latch for the hood of an automotive vehicle, said hood comprising a plurality of lateral sections, each section comprising a plurality of wings, bearings on both sections, said bearings being in alignment, means mounted in the bearings to hinge one wing to the other, crank arms at the ends of said means adapted to engage with keepers mounted on the vehicle, a crank arm intermediate the said crank ends, a link connected to the intermediary crank, and the handle connected to the link and adapted to operate the link to cause the movement of the means to cause the end cranks to be engaged with or disengaged from the keepers.

3. In a latch for the hood of an automotive vehicle, said hood comprising a plurality of lateral sections, each section comprising a plurality of wings, bearings on both sections, said bearings being in alignment, means mounted in the bearings to hinge one wing to the other, crank arms at the ends of said means adapted to engage with keepers mounted on the vehicle, a crank arm intermediate the said crank ends, a link connected to the intermediary crank, a handle turnably mounted in the hood, a crank arm on the handle inside the hood, said link connected to said crank arm, the movement of the handle causing the movement of said means to cause the end cranks to be engaged with or disengaged from the keepers.

4. In a latch for the hood of an automotive vehicle, said hood comprising a plurality of lateral sections, each section comprising a plurality of wings, means to hinge one wing to the other, crank arms at the ends of said means adapted to engage with keepers mounted on the vehicle, a crank arm intermediate the said crank ends, a link connected to the intermediary crank, a handle turnably mounted in the hood, a crank arm on the handle inside the hood, said link connected to said crank arm, the movement of the handle causing the movement of said means to cause the end cranks to be engaged with or disengaged from the keepers, and a second arm on the crank arm on the handle adapted to engage with a stationary part of the vehicle to prevent rattle of the hood and to hold the side wing in position.

5. In a latch for the hood of an automotive vehicle, said hood comprising a plurality of sections and each section comprising a top wing and a side wing, a rod for hinging one wing to the other, said rod being mounted in aligned bearings on the two wings, bent ends on the rod adapted to engage keepers secured to the vehicle, a bent part on the rod intermediate the bent ends, a link secured to the bent intermediate part and extending downward from the hinged connection between the hood wings, a crank arm adjacent the bottom of the hood, said link connected to said crank arm, a handle secured to the arm and journaled in the hood adjacent the bottom thereof, the turning of said handle causing the movement of the arm and link to cause the rotation of the rod to cause the bent ends to be engaged with or disengaged from the keepers.

6. In a latch for the hood of an automotive vehicle, said hood comprising lateral sections, each section comprising a plurality of wings, means to hinge one wing to the other, said means being mounted in aligned bearings on the wings, formed ends on said means adapted to engage with keepers mounted on the vehicle, a shaped part intermediate the formed ends, and a handle operatively connected with said shaped part to operate the said means and cause the formed ends to be engaged with or disengaged from the keepers.

7. In a latch for the hood of an automotive vehicle, said hood comprising a plurality of lateral sections, and each section comprising two wings with the edge of one wing positioned adjacent the edge of the next wing and having interfitting eyes, a rod passing through all the eyes and serving to hinge one section to the other, one of said sections being stationarily hinged to the vehicle, shaped parts on the ends of the rod adapted to engage keepers secured to the vehicle, a shaped intermediate part on the rod between the shaped ends, a journaled handle on one of the wing parts, and means connecting the handle with the intermediate shaped part, the movement of said handle causing the movement of the rod to cause the shaped ends to be engaged with or disengaged from the keepers.

8. In a latch for the hood of an automotive vehicle, said hood comprising a plurality of lateral sections, and each section comprising two wings with the edge of one wing positioned adjacent the edge of the next wing and having interfitting eyes, a rod passing through all the eyes and serving to hinge one section to the other, one of said sections being stationarily hinged to the vehicle, shaped parts on the ends of the rod adapted to engage keepers secured to the vehicle, a shaped intermediate part on the rod between the shaped ends, a journaled handle on one of the wing parts, means connecting the handle with the intermediate shaped part, the movement of said handle causing the movement of the rod to cause the shaped ends to be engaged with or disengaged from the keepers, and means operated by the handle and engaging with a stationary part of the vehicle to hold the side wing in position and prevent rattling when the hood is in closed position.

9. In a latch for the hood of an automotive vehicle having a radiator support and a cowl, said hood comprising a plurality of lateral sections and each lateral section comprising top and side wings, a stationary hinge for the top wing at substantially the middle of the hood, said side wing extending from the top wing to the vehicle fender, said side wing being shorter than the top section and terminating well to the rear of the radiator, said wings having interfitting eyes, a rod passing through the eyes to form a hinged connection between the two wings, formed ends on the rod adapted to engage keepers secured to the radiator support and to the cowl, a formed part on the rod intermediate the formed end parts, and a handle journaled adjacent the bottom of the side wing, means connecting the intermediate formed part with the handle, the rotation of the said handle causing said means to move the rod to cause the formed ends to be engaged with or disengaged from the keepers to lock or release the hood.

10. In a latch for the hood of an automotive vehicle having a radiator support and a cowl, said hood comprising a plurality of lateral sections and each lateral section comprising top and side wings, a stationary hinge for the top wing at substantially the middle of the hood, said side wing extending from the top wing to the vehicle fender, said side wing being shorter than the top section and terminating well to the rear of the radiator, said wings having interfitting eyes, a rod passing through the eyes to form a hinged connection between the two wings, formed ends on the rod adapted to engage keepers secured to the radiator support and to the cowl, a formed part on the rod intermediate the formed end parts, a handle journaled adjacent the bottom of the side wing, a plural armed crank secured to the handle, a link connecting one arm of the crank with the intermediate formed part of the rod, the second arm of the crank adapted to engage with a fixed part of the vehicle when the hood is in locked position to prevent rattle of the hood, the movement of said handle causing the movement of the rod to cause the formed ends to be engaged with or disengaged from the keepers to lock or release the hood.

11. In a latch for the hinged hood of a vehicle, a rod forming the hinge rod of the hood, a plurality of aligned bearings on the hood, said rod mounted in said bearings, means on the rod to engage keepers on the vehicle to hold the hood in latched position, and means to operate the rod to cause it to move to disengage the first named means from their keepers to unlatch the hood.

EDWARD F. REYNOLDS.